United States Patent [19]

Ross

[11] 4,419,589
[45] Dec. 6, 1983

[54] MULTI-STAGE ELECTRICAL CONTROL SYSTEM

[76] Inventor: James W. Ross, 7418 E. Cholla La., Paradise Valley, Ariz. 85253

[21] Appl. No.: 387,830

[22] Filed: Jun. 14, 1982

[51] Int. Cl.³ .............................................. H02J 3/00
[52] U.S. Cl. ...................................... 307/39; 361/191
[58] Field of Search ....................... 307/34, 38, 39, 41, 307/86, 116; 361/191

[56] References Cited

U.S. PATENT DOCUMENTS

| | | | |
|---|---|---|---|
| 1,194,165 | 8/1916 | Fry | 307/35 X |
| 2,266,152 | 12/1941 | Biebel | 307/35 X |
| 2,266,256 | 12/1941 | Osterheld | 307/35 X |
| 2,635,196 | 4/1953 | Kingsley | 307/35 |
| 2,712,101 | 6/1955 | Salati | 307/38 X |
| 2,784,322 | 3/1957 | Johnson | 307/39 |
| 2,843,759 | 7/1958 | Roots | 307/34 |
| 2,904,703 | 9/1959 | Hall | 307/34 |
| 3,066,227 | 11/1962 | Rooney | 307/34 |
| 4,100,426 | 7/1978 | Baranowski et al. | 307/41 |
| 4,310,770 | 1/1982 | Keener et al. | 307/39 X |

Primary Examiner—Elliot A. Goldberg
Assistant Examiner—Derek Jennings
Attorney, Agent, or Firm—H. Gordon Shields

[57] ABSTRACT

Multi-stage electrical load control apparatus includes current transformers for sensing the on and off status of electrical load elements and a predetermined priority system selectively allows different electrical load elements to be turned on and off in response to the sensed load status.

6 Claims, 2 Drawing Figures

MULTI-STAGE ELECTRICAL CONTROL SYSTEM

BACKGROUND OF THE INVENTION

1. Field of the Invention

This invention relates to load control apparatus for electrical loads, and, more particularly, to the control of electrical loads through a predetermined priority system.

2. Description of the Prior Art

The best utilization of electrical energy requires the disciplined use of electrical appliances. In an effort to establish a system for utilizing electrical elements properly, a priority system may be established. That is, certain electrical elements or appliances may be ranked in priority of usage, and such priority is generally in response to a predetermined decision in which the ranking of various elements, generally the elements which utilize the most electrical energy, may be utilized. Various systems have been developed in the prior art for controlling electrical loads in response to predetermined priority rankings of the various electrical elements. Among the examples of the prior art are the following U.S. Pat. Nos. 1,194,165; 2,266,152; 2,266,256; 2,635,196; 2,784,322; 2,843,759; 2,904,703; 3,005,109; 3,066,227; 4,100,426; 4,310,770.

The systems and apparatus described in the various patents cited above range from relatively simple systems to relatively complex systems. The apparatus of the present invention is a relatively simple system and relatively inexpensive in terms of accomplishing the predetermined priority determination for various electrical loads.

SUMMARY OF THE INVENTION

The apparatus disclosed and claimed herein comprises a multi-stage interlock system for controlling the electrical demand in response to a predetermined priority arrangement, using current transformers to sense on and off conditions of the high priority loads and logic circuitry to turn off and on the various loads in accordance with their priority and in response to output information from the various current transformers.

Among the objects of the present invention are the following:

To provide new and useful apparatus for controlling electrical demands;

To provide new and useful apparatus for controlling electrical demands in response to predetermined priorities;

To provide new and useful apparatus for controlling the on and off status of a plurality of electrical elements;

To provide new and useful apparatus for controlling the on and off status of predetermined electrical elements in response to a predetermined priority system; and To provide new and useful apparatus for turning on and off electrical elements in response to predetermined priorities of usage of the electrical elements.

DESCRIPTION OF THE PREFERRED EMBODIMENT

Figure 1:
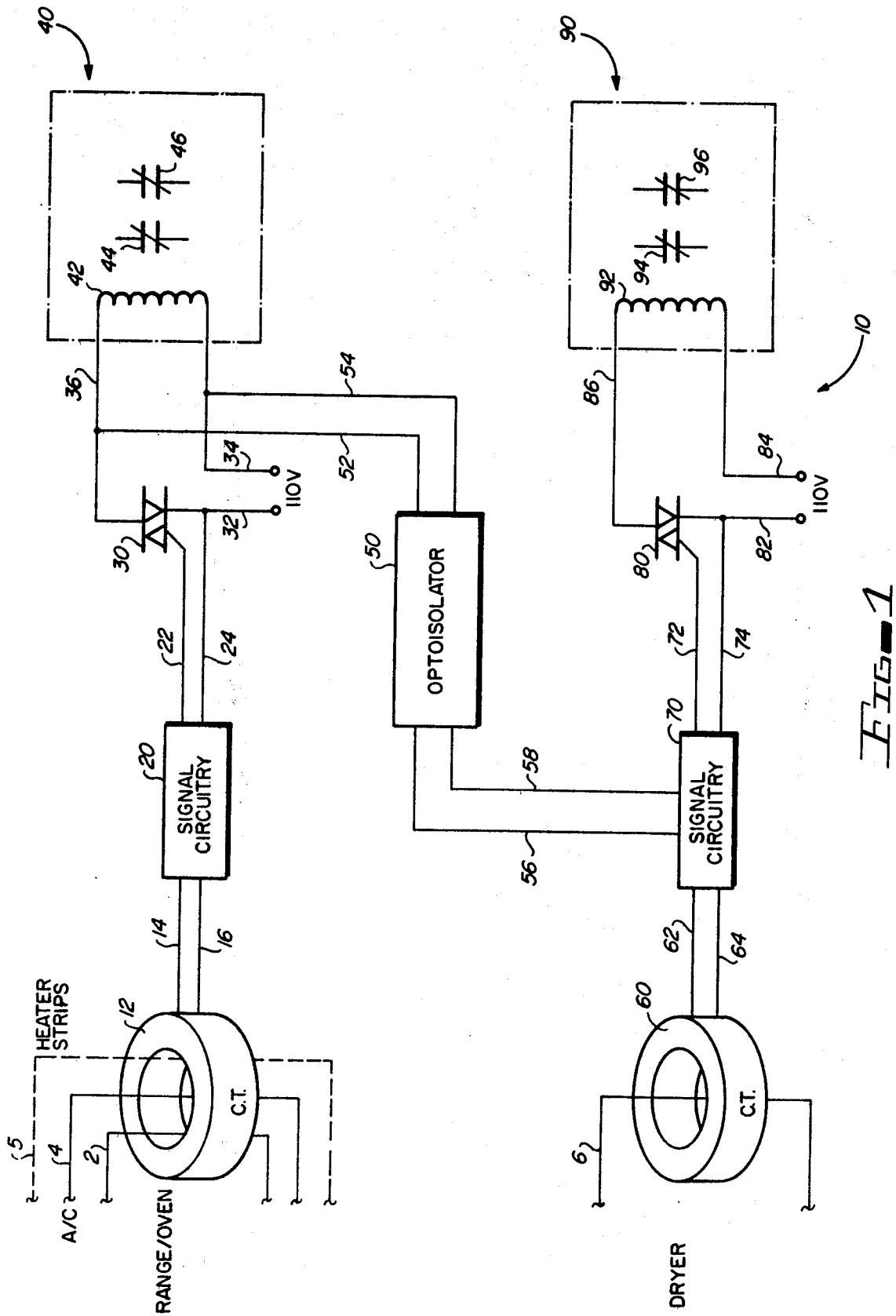
FIG. 1 is a schematic representation of the apparatus of the present invention.

Load demand apparatus 10 includes a pair of current transformers 12 and 60 that are respectively connected to appropriate signal circuitry blocks 20 and 70. A pair of conductors 2 and 4 extend through the current transformer 12, while a single conductor 6 extends through the current transformer 60. The conductor 2 comprises one leg of a 220 volt line that is connected to an electric range/oven system in a structure, such as, for example a home. The conductor 4 comprises one leg of a 220 volt electrical line connected to an air conditioning system for a home. Since both conductors 2 and 4 are part of separate electrical elements, and consist only of a single leg of an electrical line for the respective systems, both conductors 2 and 4 must be connected to the same phase of the electrical system. Otherwise, if the conductors were of different phases, the different phases would cancel each other out. Thus the current transformer would not respond when both the range/oven and air conditioning systems were on at the same time. Rather, the current transformer would show that no current was flowing in the conductors 2 and 4, when in fact current was flowing in both of them. Accordingly, the conductors 2 and 4 are both of the same phase of the electrical distribution system.

A third conductor 5 is shown in phantom extending through the current transformer 12. The conductor 5 may be one leg of a 220 volt electrical line connected to heater or heating strips. The strips comprise the winter equivalent of the air conditioner. The conductor 5 must be of the same phase of the line as conductors 2 and 4 for the same reason as previously discussed.

Conductor 6, which extends to the current transformer 60, is connected to, or comprises one leg of, a 220 volt electrical line connected to an electric dryer in the home. Since only a single conductor extends through the current transformer 60, the particular phase of the electrical transmission line is immaterial.

Certain priorities have been predetermined for the load control apparatus 10. The first priority has been predetermined to be the range and oven, represented by the conductor 2. The air conditioner, represented by the conductor 4, is of the same priority as the oven, namely first priority, and so is the heater strips for the line 5. That is, all of the electrical elements or appliances associated with the current transformer 12 are of equal priority, and their priority is number one, or paramount, in the system 10. The next, or second, priority belongs to the dryer. Of the same priority as the dryer is a swimming pool filter pump. The lowest, or third, priority has been determined to be a water heater and a swimming pool sweep pump. The pumps and water heater will be discussed below.

The current transformers 12 and 60 are used to sense or to determine the condition of the three high priority electrical loads. The current transformer 12 is used to sense the "on" condition of the highest priority loads, which comprise the range/oven and the air conditioning system, connected respectively to the conductors 2 and 4. The current transformer 60 is used to sense the "on" condition of the electrical dryer, which is second in priority, and which is connected to the conductor 6.

Information from the current transformers 12 and 60 is transmitted to signal circuitry blocks which include logic circuitry and which are designated respectively by blocks 20 and 70. The signal circuitry blocks 20 and 70 are in turn connected to a pair of triacs 30 and 80 and to a pair of relays 40 and 90. The relays 40 and 90 are both double pole, normally closed relays. Each relay has two pairs of electrical poles or contacts which are normally closed. Upon the activation or actuation of the relays, the normally closed relay contacts open, thus opening the associated line circuits, and shedding the electrical loads (appliances or elements) connected to the circuits.

Included in the relay 40 is a relay coil 42 and a pair of relay contacts 44, which are normally closed, and a pair of relay contacts 46, which are also normally closed. The relay contacts 44 are connected to the dryer, and the relay contacts 46 are connected to the swimming pool filter pump. When the relay contacts are closed, electrical current may flow to the dryer and to the swimming pool filter pump, as desired. When the relay 40 is actuated, the relay contacts 44 and 46 open to turn off the dryer and the swimming pool filter pump.

The relay 90 includes a relay coil 92 and a pair of relay contacts 94, which are normally closed, and a pair of relay contacts 96, which are also normally closed. The relay contacts 94 are connected to the water heater, and the relay contacts 96 are connected to the swimming pool sweep pump. When the relay 92 is actuated, the relay contacts 94 and 96 open to turn off the water heater and the swimming pool sweep pump.

The current transformer 12 is connected to the signal circuitry block 20 by a pair of conductors 14 and 16. The conductors 14 and 16 comprise input conductors from the current transformer 12 to the signal circuitry block 20. Included as part of the logic and control circuitry, and connected to the signal circuitry block 20, is a triac 30. A conductor 22 extends from the signal circuitry block 20 to one terminal, the gate terminal, of the triac 30. A conductor 32 is also connected to the triac 30. The conductor 32 comprises one leg of a 110 volt line. A conductor 34, which is the second leg of the 110 volt line, extends to one end of the relay coil 42. A conductor 24 extends between the signal circuitry block 20 and the 110 volt conductor 32. A conductor 36 extends from the triac 30 to the opposite end of the relay coil 42 from where the conductor 34 is connected to the relay coil.

A conductor 52 extends from the conductor 36 to an optoisolator 50. Another conductor 54 extends from the conductor 34 to the optoisolator 50. From the optoisolator 50, a pair of conductors 56 and 58 extend to the signal circuitry block 70. The conductors 56 and 58 comprise one pair of inputs to the signal circuitry block 70.

In addition to the conductors 56 and 58 from the optoisolator 50, a second pair of conductors 62 and 64 also comprise inputs to the signal circuitry block 70. The conductors 62 and 64 extend from the current transformer 60 to the signal circuitry 70.

A triac 80 is connected to the relay coil 92 and to the signal circuitry block 70. A conductor 72 extends from the signal circuitry block 70 to the triac 80, and a pair of 110 volt line conductors 82 and 84 are connected to the triac 80 and to the relay coil 92, respectively. The conductor 82 extends to the triac 80, while the conductor 84 extends to one end of the relay coil 92. A conductor 86 extends from the triac 80 to the opposite end of the relay coil 92 from where the conductor 84 is connected. A conductor 74 extends from the 110 volt conductor 82 to the signal circuitry block 70.

With the range/oven and air conditioner having top or first priority for the electrical system in the home, current flow through either or both conductors 2 and 4 will cause an output from the current transformer 12. Preferably, the current transformer 12 will be turned on by a current of from nine to twelve amps flowing in either or both of the conductors 2 and 4. The output of the current transformer 12 is transmitted to the signal circuitry block 20 through conductors 12 and 14. The input from the current transformer 12 to the signal circuitry 20 in turn results in an output signal which is transmitted on conductor 22 to the triac 30. The output signal from the signal block 20 on conductor 22 causes the triac 30 to be turned on, and accordingly current flows through the conductor 32, through the triac 30, and through conductor 36 to the relay coil 42. This causes the relay coil 42 to actuate and thus to open the relay contacts 44 and 46.

If the dryer and the swimming pool filter pump, or either of them, is "on" when the relay 40 is actuated by the current flow through the relay coil 42, they, the electrical elements or appliances, will be turned off. On the other hand, if the electrical elements are off when the relay is actuated, they will be prevented from turning on due to the opening of the relay contacts 44 and 46.

The sensing of either the range of the air conditioner in an "on" condition by the current transformer 12 also causes an input signal to the optoisolator 50 on conductors 52 and 54. The input results in an output signal on conductors 56 and 58 to the signal circuitry 70. The optoisolator 50 is turned on by an appropriate electrical signal on the conductors 52 and 54. Thus, when the signal circuitry 20 is actuated, and the relay 40 is actuated, a signal from the optoisolator 50 will also cause the signal circuitry 70 to be actuated. This will result in turning on the triac 80 and causing the relay 90 to be actuated. The electrical connection between the signal circuitry 70 and its triac 80 and its relay 90 is substantially identical to the operation described above with respect to the signal circuitry 20, the triac 30, and the relay 40.

The 110 volt line is connected to the relay coil 92, the triac 80, the signal circuitry 70, by a pair of conductors 82 and 84. The triac 80 is turned on by an output signal from the signal circuitry block 70 on conductor 72. When the triac 80 is turned on, current flows through the triac 80 to the relay 90 by conductor 86, which extends from the triac 80 to the relay coil 92. When the relay 90 is actuated by current flow through its coil 92, the normally closed contacts 94 and 96 open, thus either turning off the water heater and the swimming pool sweep pump, or preventing them from turning on.

The signal circuitry 70 may also be turned on by current transformer 60. The current transformer 60 preferably is turned on by a current flow of from about three to six amps, which is substantially less than the current flow required to turn on the current transformer 12, as discussed above. Thus, there are two ways of causing the relay 90 to actuate and to disconnect, or to prevent from being connected, the water heater and the swimming pool sweep pump, which are of the lowest priority in the priority system established in the present embodiment.

The turning on of the dryer will cause an output signal from the signal circuitry block 70 which will result in the actuation of the relay 90, and the turning on of either the range or air conditioner will also cause the signal circuitry 70 to provide an output signal which will cause the relay 90 to be actuated. In either case, the lowest priority electrical elements, namely the water heater and the swimming pool sweep pump, will be disconnected or will be prevented from being turned on.

However, the turning on of the dryer can only be accomplished when neither the range nor the air conditioner is on, since the dryer is connected to the relay contacts 44 of the relay 40. Thus, in the hierarchy of the priority system established herein, the dryer may only be separated when neither the range nor the air conditioner is on. The turning on of either the range or the air conditioner will cause, through the current transformer 12, the signal circuitry 20, the triac 30, and the relay 40, the dryer to turn off, or, if already off, will prevent the dryer from being turned on as long as either the range or the air conditioner is on. Through the optoisolator 50 and the signal circuitry 70, the water heater and the swimming pool sweep pump will both be turned off, or will both be prevented from being turned on, if any one of the three higher priority elements is on.

The highest priority electrical elements, the range and/or the air conditioner, when on, will cause actuation of the relay 90 through the optoisolator 50, the signal circuitry 70, and the triac 80. When neither the electric range/oven or the air conditioner is on, the dryer may be turned on. If the dryer is then turned on, the sensing of its on condition by the current transformer 60 will also result in the relay 90 being actuated through the signal circuitry 70, and the triac 80. Thus, both the water heater and the swimming pool sweep pump will be turned off or will be prevented from being turned on by the actuation of any one of the three higher priority elements, namely the range/oven, the air conditioner, or the dryer.

The range/oven and the air conditioner both have equal priority in the system described herein. The actuation of either one will not affect the actuation of the other one. Thus, they may both be on at the same time. However, the actuation of either one of them, or both of them, will cause all of the electrical elements having a lower priority to be turned off or will be prevented from being turned on. Thus, the dryer and the swimming pool filter pump and the water heater and the swimming pool sweep pump will all be turned off or will be prevented from being turned on while either or both the range/oven and air conditioner are on.

The dryer has secondary priority, and the turning on of the dryer, with both the range/oven and air conditioner off, will cause the electrical elements of tertiary priority, namely the water heater and the swimming pool sweep pump, to be turned off. However, the actuation or turning on of the dryer will have no effect on the swimming pool filter pump. The swimming pool filter pump, along with the dryer, is of secondary priority, and it will only operate when neither the range/oven nor the air conditioner is turned on, since it is connected to the relay 40, as is the dryer.

The swimming pool filter pump is not connected to a current transformer, and its operation, which is only when neither the range/oven nor the air conditioner is on, will not affect the turning off, or the preventing from being turned on, of the water heater and the swimming pool sweep pump.

The optoisolator 50 is used to isolate or to keep separate the subsystem or circuitry associated with the current transformer 12, the signal circuitry 20, the triac 30, and the relay 40 from the subsystem comprising the current transformer 60, its signal circuitry 70, the triac 80, and the relay 90. In place of the optoisolator 50, a relay could also be used. However, the two subsystems must be kept isolated or separated. Otherwise, actuation of one could also lead to actuation of the other due to the common 110 volt system and the various phases of the 220 volt lines as sensed by the current transformers 12 and 60.

By using current transformers to sense the on and off condition or status of the various electrical elements or appliances, all sensing and control may be accomplished at the electrical service entrance panel. Thus, the use of the current transformers precludes the necessity of rewiring in the house to sense the on and off status of the various elements or appliances involved.

Figure 2:
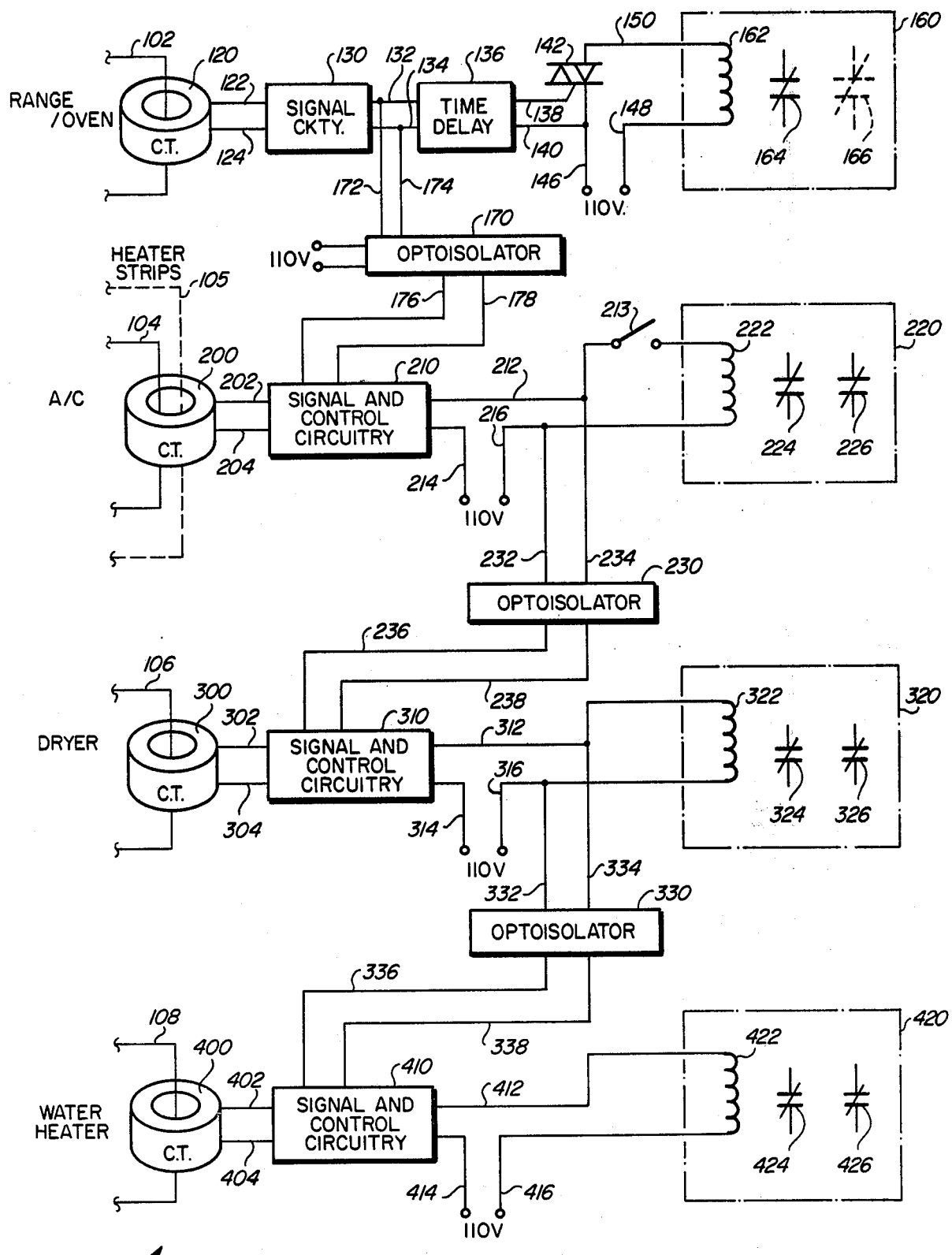
FIG. 2 is a schematic representation of an alternate embodiment of the present invention.

FIG. 2 comprises a schematic diagram of an alternate embodiment of the apparatus of FIG. 1. As is obvious, additional current transformers, signal and control elements, including relays and optoisolators could be added to the apparatus of FIG. 1 in order to control additional electrical elements having lower priorities, if desired. Also, the range/oven and the air conditioner may be granted different priorities instead of equal priorities, as shown in FIG. 1. In FIG. 2, the range/oven is granted top or first priority, the air conditioner (and heater strips) is (are) granted secondary priority, the dryer is granted third priority, and the water heater is granted fourth priority. The apparatus of FIG. 2, comprising load control apparatus 110, is substantially identical to the apparatus 10 of FIG. 1, with additional systems added to it to handle the additional priority elements, except that for the air conditioner a time delay element is included.

FIG. 2 is a schematic representation of load control apparatus 110 which includes four current transformers, including current transformer 120, current transformer 200, current transformer 300, and current transformer 400. The current transformer 120 includes a conductor 102 extending therethrough. The conductor 102 is one leg of a 220 volt line connected to an oven/range. The current transformer 200 includes a conductor 104 extending through it. The conductor 104 is one leg of a 220 volt line for an air conditioner. Also extending through the current transformer 200 is a conductor 105, shown in phantom. The conductor 105 represents one leg of a 220 line connected to appropriate heating elements, or heater strips. Thus, for summer, the air conditioner is connected to conductor 104, and for the winter, the conductor 105 is connected to heater strips. If a heat pump is used for summer cooling and winter heating, the single conductor 104 may be used in both summer and winter.

A conductor 106 extends through the current transformer 300. The conductor 106 is connected to one leg of a 220 volt line for an electric dryer. Finally, a conductor 108 extends through the transformer 400. The conductor 108 comprises one leg of a 220 volt line for a water heater. Since each of the current transformers includes only a single conductor for a particular appliance or electrical element, the particular phase associated with the conductors is immaterial.

In the load control apparatus 110, five priorities of usage for the electrical current are shown. The range/oven is first priority, and it is associated with the conductor 102 and the current transformer 120. The second priority is the air conditioner/heater elements associated with the current transformer 200 and conductors 104 and 105. The third priority is the dryer, connected to the conductor 106. The fourth priority is the water heater connected to the conductor 108 and associated with the current transformer 400. The fifth priority comprises the electrical elements connected through relay contacts of a relay 420. The relay 420 is activated in response to the output from the current transformer 400 and/or the optoisolator 330.

The current transformer 120, responsive to the "on" condition of the range/oven by the current flow through the conductor 102, is connected to a signal circuitry block 130 by a pair of conductors 122 and 124. A time delay block 136 is connected to the signal circuitry block 130 by a pair of conductors 132 and 134. The time delay block is connected to a triac 142. The triac 142 is also connected to a relay 160 and to a pair of 110 volt line conductors 146 and 148.

The triac 142 is turned on by an appropriate current flow on conductor 138 which extends from the time delay block 136 to the gate terminal of the triac 142. A conductor 140 extends between the 110 volt line 146 and the time delay block 136. A conductor 150 extends from the output terminal of the triac 142 to one end of a relay coil 162 of a relay 160. The 110 volt line conductor 148 is connected to the opposite end of the relay coil 162 from where the conductor 150 is connected.

The relay 160 may be either a single pole or double pole, normally closed relay. That is, it may contain either one or two pairs of relay contacts which are normally closed when the relay is not actuated. A pair of relay contacts 164 is shown. Another pair of relay contacts 166 is shown in phantom. The relay contacts 164 are connected to the air conditioner system. Thus, while the relay 160 is in its off or unactuated condition, the relay contacts 164 will be closed and the air conditioner or heater strips, as the case may be, may be turned on. The relay contacts 164 are preferably connected through the thermostatic control system for the air conditioner or heater strips.

Due to the pressures involved in the air conditioning system, it is preferable to use the time delay block 136 to prevent the reactuation of the air conditioner within a predetermined time period. If, for example, the range or oven is cycled or turned "off" and "on" within a relatively short period of time, such as a minute or so, the time delay apparatus 136 prevents the air conditioner from turning on, then off, then on again within that relatively short period of time.

Once the range/oven is turned on, and the turning on is sensed by the current transformer 120, an appropriate signal is transmitted to the signal circuitry 130 on conductors 122 and 124. A signal is then transmitted to the time delay block 136 and to the triac 142. When the triac 142 is turned on, current flow through the triac 142 actuates the relay 160, opening the relay contacts 164 and turning off the air conditioner or heater, whichever may be on. The time delay block 136 insures that the triac 142 will be held on for a predetermined time period, such as four or five minutes, to prevent the air conditioner from being actuated within that predetermined time period if the range/oven should be turned off within the predetermined time period.

In the event that the range or the oven is turned off within a minute or two after being turned on, without the time delay 136 the triac 142 would turn off, thus deactivating or turning off the relay 160. The relay contacts 164 would again close, allowing the air conditioner, connected to the relay contacts 164, and also to the conductor 104, to turn on. However, such a short period of time after the air conditioner's being turned off would not allow the pressures within the air conditioner system to stabilize and if the air conditioner were turned on again, the pressures resulting therefrom could damage the air conditioning system. The utilization of the time delay 136 holds the triac 142 in its conducting or "on" state for the predetermined time period, insuring that the air conditioner does not come on during that time period, regardless of the cycling of the oven/range.

When the range/oven is turned on, the signal circuitry 130, in addition to turning on the triac 142, also transmits a signal on conductors 172 and 174 to the optoisolator 170 from conductors 132 and 134, respectively. The optoisolator 170 is connected to the 110 volt line power source. The optoisolator 170 provides an output signal on a pair of conductors 176 and 178 to a signal and control circuitry block 210. The signal and control circuitry block 210 is connected to the current transformer 200 by a pair of conductors 202 and 204. The signal and control circuitry block 210 accordingly is activated or turned on by input signals from either the conductors 202 and 204 from the current transformer 200 or from the optoisolator 170 by the pair of conductors 176 and 178.

When the air conditioner is (or the heater strips are) turned on, and current flows through their conductors 104 (or 105), the current transformer 200 senses the "on" condition of the particular appliance and transmits an appropriate signal on the conductors 202 and 204 to the signal control circuitry block 210. The signal and control circuitry block 210 includes appropriate signal circuitry, such as included in the signal circuitry block 130, and also a control element(s), such as the triac 142. For convenience of illustration and discussion, both the signal circuitry block and a triac are included in the signal and control circuitry block 210.

The signal and control circuitry block 210 is connected to a relay 220 by a conductor 212. The conductor 212 may include a SPST switch 213 which acts as an override to allow the dryer to operate at the same time as the air conditioner and/or range/oven, if desired. The relay 220 includes a relay coil 222 and, assuming that the relay 220 is a double pole, normally closed relay, includes a pair of relay contacts 224 and a pair of relay contacts 226. The relay contacts 224 are connected to a dryer, and the relay contacts 226 may be connected to other appropriate electrical elements, such as a swimming pool filter pump, or the like.

When the range/oven is on, or the air conditioner (heater) is on, the signal and control circuitry 210 will cause the relay 220 to be actuated, thus opening the relay contacts 224 and 226. The relay 220 will be actuated by an input signal to the signal and control circuitry block 210 on the conductors 202 and 204 from the current transformer 200, or from an appropriate signal from an optoisolator 170 on conductors 176 and 178 when the range/oven, connected to the connector 102, is on.

It will be noted that the conductors 172 and 174 for the optoisolator 170 are connected to their conductors between the signal circuitry block 130 and the time delay element 136. Thus, the time delay, which prevents the air conditioner from coming on within a predetermined time after the range/oven is initially turned on, will not result in the shedding of additional electrical loads, such as the dryer and the water heater. That is, the optoisolator 170 will provide an input signal to the signal and control circuitry block 210 only when the range/oven is on, and an output signal from the optoisolator 170 will not be influenced by the time delay block 136. Accordingly, even though the air conditioner may not come on for a predetermined time after the range/oven is initially turned on, assuming that the range/oven is turned off within a relatively short period of time, or within the time period of the time delay element 136, the third priority element, such as a dryer, or fourth priority element, such as a water heater, may be activated during the time delay period when the air conditioner remains in its off status.

A pair of 110 volt electrical conductors 214 and 216 are connected respectively to the signal and control circuitry block 210, and the relay coil 222 of the relay 220. A conductor 212 extends from the signal and control circuitry block 210 to one end of the relay coil 222, remote from the end of the coil 222 where the line conductor 216 is connected. An optoisolator 230 is connected to the conductors 212 and 216 by a pair of conductors 234 and 232, respectively.

When the signal and control circuitry block 210 receives an input signal from either the current transformer 200 or the optoisolator 170, the relay 220 is actuated, thus opening its relay contacts 224 and 226. At the same time, the optoisolator 230 is turned on by current flow on the conductors 232 and 234 and provides an input signal to a signal and control circuitry block 310.

The signal and control circuitry block 310 is substantially identical to the signal and control circuitry block 210. It is connected to the current transformer 300 by a pair of conductors 302 and 304, and to the optoisolator 230 by the conductors 236 and 238. The signal and control circuitry block 310 is connected to a relay 320 by a conductor 312. The conductor 312 extends to one end of a relay coil 322. The relay 320 also includes a pair of relay contacts 324 and 326. The relay contacts 324 and 326 are normally closed. The 110 volt line is connected to the signal and control circuitry block by a conductor 314 and to the relay coil 322 by a conductor 316. The conductor 316 is connected to the coil 322 at the opposite end from where the conductor 312 is connected.

The relay contacts 324 are connected to the water heater, and the relay contacts 326 are connected to another fourth priority electrical element, such as a swimming pool sweep motor.

A conductor 332 extends between an optoisolator 330 and the conductor 316. Conductor 334 extends from the conductor 312 to the optoisolator 330. Output from the optoisolator 330 extends to a signal and control circuitry block 410 by a pair of conductors 336 and 338.

The signal and control circuitry block 410 is connected to the current transformer 400 by a pair of conductors 402 and 404. The signal and control circuitry block 410 is also connected to a relay 420 by a conductor 412. The 110 volt line is connected to the signal and control circuitry block 410 by conductor 414 and to the relay 420 by a conductor 416.

The relay 420 includes a relay coil 422, the opposite ends of which are connected to the conductors 412 and 416, respectively. Also included in the relay 420 are a pair of relay contacts 424 and a pair of relay contacts 426, both pairs of which are normally closed.

The water heater, which is a fourth priority appliance, is connected to the conductor 108 and is controlled through the relay contacts 324 of the relay 20. In turn, the water heater controls the relay 420 and its relay contacts 424 and 426. Any appropriate electrical appliances or elements may be connected to the relay contacts 424 and 426, as desired. When the water heater is on, its "on" status is sensed by the current transformer 400 and an appropriate signal is transmitted to the signal and control circuitry block 410 on the conductors 402 and 404. The signal and control circuitry block 410 is substantially identical to the signal and control circuitry blocks 310 and 210 which have been discussed above. An output signal from the signal and control circuitry block 410 on conductor 412 actuates the relay 420 and causes the two pairs of relay contacts 424 and 426 to open, thus shedding the electrical appliances or elements connected thereto, or preventing them from being turned on. The shedding of the additional electrical load connected to the relay contacts 424 and 426 represents the shedding of the fifth level of priority of electrical appliances. If desired, additional current transformers, signal and control circuitry blocks, and relays could be added to those illustrated in FIG. 2. Moreover, the relays may be either single pole or double pole, as desired. The relays 220, 320, and 420 are illustrated as being double pole, normally closed relays. The relay 160 is illustrated as being a single pole, normally closed relay, with a second pole drawn in phantom. The second pair of contacts 166 for the relay 160 may control a spa heater, or other electrical load, as desired.

It will be noted that when a higher priority electrical load is on, all lower electrical priority loads are shed or are prevented from coming on due to the output signal from one optoisolator to the next sequential signal and control circuitry block, the next sequential optoisolator, and so forth, in a cascade-like fashion. In effect, the lower priority electrical elements or appliances are only allowed to be turned on when the higher priority electrical appliances are off.

As indicated above in the discussion of the electrical load control apparatus of FIG. 1, the optoisolators illustrated with the electrical load control apparatus 110 of FIG. 2 may be replaced by relays, if desired. However, in both embodiments of FIGS. 1 and 2, the different circuit systems should be isolated from each other.

As also discussed above, the utilization of current transformers allows the sensing of the electrical loads to be accomplished at the electrical service entrance panel, thus precluding the necessity of rewiring a housing for sensing purposes.

The time delay element 136, connected in series between the signal circuitry block 130 and the triac 140, holds the triac 142 open for a predetermined time period after the range/oven comes on, regardless of the range/oven condition. If the range comes on for a minute, then goes off for a minute, and then on again, the time delay block 136 will prevent the air conditioner from actuating during the "off" intervals in order to protect the air conditioner, all as discussed above. However, with the second, third, and fourth priority systems, no time delay is needed, and for the illustrative purposes of FIG. 2, the triacs have been included with the signal circuitries, thus providing a single signal and control circuitry block for each system. If the range/oven and the air conditioner are given equal priority, as in the embodiment of FIG. 1, then the necessity for the time delay block is removed. However, when the air conditioner is given a secondary priority, then the time delay block is necessary to protect the air conditioner.

The override switch 213 is shown in conductor 212. By opening the switch 213 the relay 220 is bypassed, thus allowing the relay contacts 224 and 226 to remain closed even though the air conditioner, and/or the range/oven may be on or may come on. However, the switch 213 does not affect the optoisolator 230 or the optoisolator 330, and therefore the fourth and fifth priority elements remain "off" or are shed when a higher priority element comes "on".

If desired, override switches, such as the switch 213, may be inserted into the conductors 150 and 412 and into the conductor 312 between the conductor 334 and the relay 320. The override switches would allow a particular circuit for a lower priority element to function even though a higher priority load was "on". The override function allows selective overriding without interfering with the normal priority selection for the control of the electrical loads.

In the embodiment of FIGS. 1 and 2, current transformers are used to sense the status of the various electrical loads. This sensing may be accomplished at the electrical service panel entrance. However, it may be advantageous for some applications to use stepdown transformers for remote sensing. For example, a 220 volt (primary) transformer may be connected to each load. When a load is actuated ("on"), the secondary of the transformer may provide a low voltage, such as a 24 volt, signal to the appropriate signal circuitry. In all other respects, the systems would operate as described.

While the principles of the invention have been made clear in illustrative embodiments, there will be immediately obvious to those skilled in the art many modifications of structure, arrangements, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Load control apparatus for controlling a plurality of electrical loads having different predetermined priorities, comprising, in combination:
   electrical load means, including
      a first electrical load having a first priority,
      a second electrical load having a second priority, and
      a third electrical load having a third priority;
   sensing means for sensing the "on" status of the first and second electrical loads and for providing output signals in response thereto; and
   disconnect means for disconnecting the electrical loads in response to the output signals of the sensing means, including
      first disconnect means for disconnecting the second electrical load in response to the sensed "on" status of the first electrical load,
      second disconnect means for disconnecting the third electrical load in response to the sensed "on" status of the first or second electrical loads,
      first signal circuitry means for providing an output signal to the first disconnect means in response to the sensed "on" status of the first electrical load,
      second signal circuitry means for providing an output signal to the second disconnect means in response to the sensed "on" status of the first or second electrical loads; and
   isolation means for isolating the first signal circuitry means and the first disconnect means from the second signal circuitry means and the second disconnect means.

2. The apparatus of claim 1 in which the disconnect means further includes means for providing a signal to the second signal circuitry means from the first signal circuitry means in response to the sensed "on" status of the first electrical load.

3. The apparatus of claim 1 in which the first signal circuitry means includes means for providing a signal to the second signal circuitry means in response to the output signal from the first signal circuitry means for causing an output signal to the second disconnect means in response to the sensed "on" status of the first electrical load.

4. The apparatus of claim 1 in which the sensing means includes a first current transformer for sensing the "on" status of the first electrical load and a second current transformer for sensing the "on" status of the second electrical load.

5. The apparatus of claim 1 in which the disconnect means further includes override means for selectively preventing an electrical load from being disconnected.

6. The apparatus of claim 1 in which the disconnect means further includes time delay means for maintaining the second electrical load in a disconnected state for a predetermined time period after it has been disconnected without regard to the sensed "on" condition of the first electrical load.

* * * * *